United States Patent [19]
Huszar

[11] 3,794,290
[45] Feb. 26, 1974

[54] PRESSURE FLUID CONTROL VALVE

[75] Inventor: Josef Huszar, Kapfenberg, Austria

[73] Assignee: Gebr. Boehler & Co. AG, Vienna, Austria

[22] Filed: Aug. 2, 1972

[21] Appl. No.: 277,382

[30] Foreign Application Priority Data
Oct. 19, 1971  Austria................................. 9014

[52] U.S. Cl. .............................................. 251/347
[51] Int. Cl. ............................................ F16k 31/44
[58] Field of Search ... 251/347, 341, 346, 349, 351, 251/318

[56] References Cited
UNITED STATES PATENTS

| | | | |
|---|---|---|---|
| 2,906,493 | 9/1959 | Whitener | 251/346 |
| 2,121,268 | 6/1938 | Shaffer | 251/346 |
| 2,944,793 | 7/1960 | Conrad | 251/341 X |
| 2,509,470 | 5/1950 | Baker | 251/347 |
| 2,553,991 | 5/1951 | Wagner et al. | 251/318 X |
| 2,690,807 | 10/1954 | Moosman | 251/341 UX |
| 3,151,839 | 10/1964 | Mott | 251/351 |
| 2,901,001 | 8/1959 | Nutter | 251/349 X |
| 3,667,505 | 6/1972 | Radig | 251/315 X |

Primary Examiner—Samuel Scott
Attorney, Agent, or Firm—Arthur O. Klein

[57] ABSTRACT

The valve serves to control the supply of pressure fluid from a first tubular member constituting a pressure fluid outlet to a second tubular member which forms part of a pressure fluid consumer which is movable relative to said first tubular member between a first position more remote from said first tubular member and a second position nearer to said first tubular member. The valve comprises an inner sleeve secured to said second tubular member and an outer sleeve surrounding said inner sleeve and secured to said first tubular member. The inner and outer sleeves define together a flow path adapted to establish a communication between said first and second tubular members. A valve seat is secured to said outer sleeve and forms a frustoconical constriction in said flow path. A valve cone is disposed in said flow path on the side of said valve seat which is opposite to said inner sleeve and axially movable relative to said valve seat and adapted to sealingly engage the same. Said valve cone has an outside diameter which exceeds the inside diameter of said constriction. Spacing means are disposed between said valve cone and said inner sleeve and arranged to hold said valve cone clear of said valve seat unless said inner and outer sleeves are in a relative position corresponding to said second position of said second tubular member.

6 Claims, 1 Drawing Figure

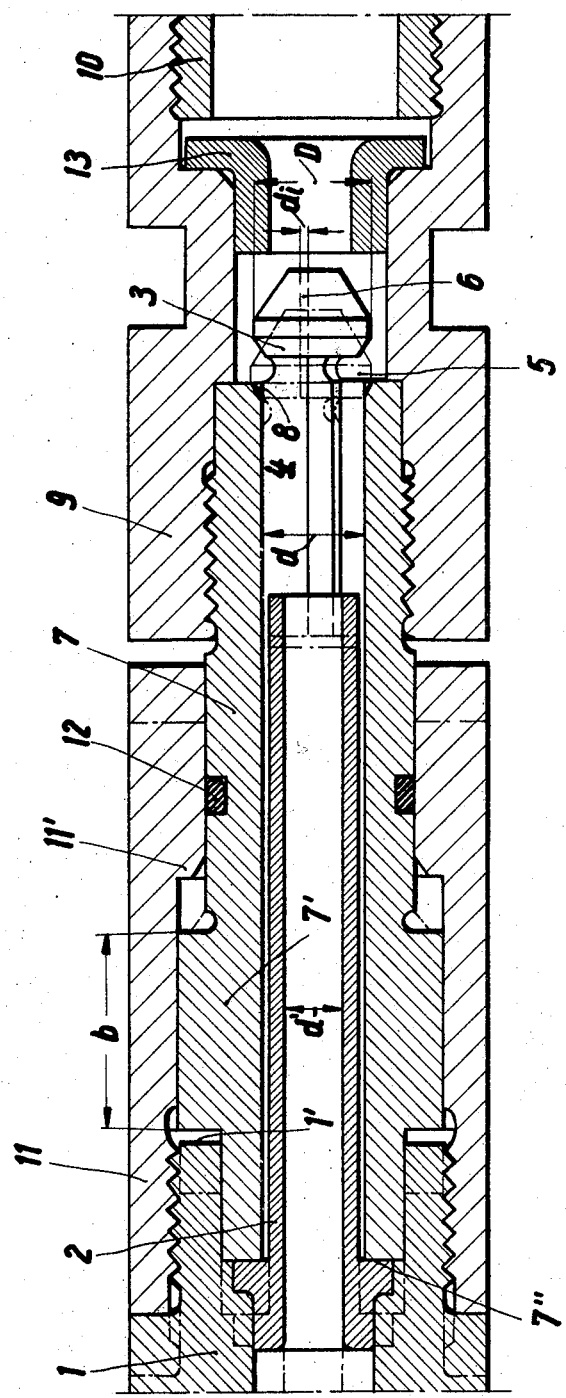

PRESSURE FLUID CONTROL VALVE

This invention relates to a valve for controlling the supply of pressure fluid to a percussion drill, which valve is connected between said drill and a hollow fitting, which drill and fitting are two members which are capable of a limited relative displacement. When the percussion drill has been retracted toward the fitting, the housing of the apparatus bears on one of these relatively movable members and the valve member bears on the other of said members.

When a percussion drill is pulled out of the bore-hole or its cutter bit breaks into a cavity when drilling, so-called idle blows will be effected, in which the full kinetic energy of the percussion piston acts on the holder for the cutter bit. If pressure fluid is supplied to the percussion drill, for these idle blows, the rate of which is not much less than for normal working blows, the above mentioned holder often suffers damage after a relatively short operating time.

This disadvantage is allegedly avoided in a valve of the kind mentioned first hereinbefore in a prior art arrangement in which the valve member has a head-shaped portion, which together with a constriction in the housing defines a throttling gap for the compressed air flowing to the percussion drill when the percussion drill has been advanced relative to the drill pipe, i.e., during the idle blows. The described valve has the disadvantage that it is difficult in practice to provide a throttling gap which is dimensioned so that the idle blows are effected with the optimum force.

It is an object of the invention to avoid the stated disadvantages and to provide a valve which can easily be designed so that idle blows are either avoided entirely or are effected under the force which is optimum for the percussion drill concerned. In a valve of the kind mentioned first hereinbefore, this is accomplished according to the invention in that the valve member is a valve cone, which has an outside diameter that is larger than the inside diameter of the valve seat in the housing and which is in sealing engagement with the valve seat when the percussion drill has been advanced from the fitting.

In a preferred embodiment of the apparatus according to the invention, relatively strong working blows but light idle blows are effected because a duct is provided, which is connected in shunt to the valve gap and preferably consists of an axial bore in the valve cone.

An embodiment of the percussion drill according to the invention is shown by way of example in a diagrammatic longitudinal sectional view in the single FIGURE of the drawing.

A hollow spacer 2 is fixed, preferably by being pressed-in, to the cylinder 1 of a pneumatic percussion drill. (The above-mentioned percussion drill is a down-the-hole drill, which comprises a cutter bit, a percussion piston, and a compressed-air control valve, which supplies compressed air in alternation to the two ends of the percussion piston.). The spacer 2 is substantially a cylindrical tubular member, which is engaged during the drilling operation by three guide webs 4 connected to a valve cone 3. The valve housing consists of a valve body 7, which surrounds the spacer 2, and a connecting fitting 9, which is screwed to the valve body 7 and to an extension pipe 10 of the drill pipe. The valve body 7 is provided with the conical valve seat 8, which cooperates with the valve cone 3. The outside diameter D of the valve cone 3 exceeds the inside diameter $d$ of the valve seat 8. To prevent the valve cone 3 from falling out of the valve when the percussion rill has been removed from the borehole and is turned upside down, a stop member 13 is secured, preferably pressed-in, in the fitting 9. The cylinder 1 is connected to the valve body 7 by means of a retaining cap 11, which is secured to the cylinder and embraces a collar 7', which is provided on the valve body 7. Because the distance between the end face 1' of the cylinder 1 and the inwardly extending shoulder 11' of the retaining cap exceeds the axial length $b$ of the collar 7', the cylinder 1 together with the spacer 2 secured to it is capable of a predetermined reciprocation relative to the valve body 7. The gap which is defined by the retaining cap 11 and the valve body 7 is sealed from the outside by means of an 0-ring 12, which is disposed in a groove of the valve body 7. The valve cone 3 is formed with an axial bore 6, which has a diameter $d_1$ that is smaller than the inside diameter $d'$ of the spacer 2. (Instead of that bore 6 in the valve cone 3, a similar bore might be formed in the valve body 7). Only the last pipe section 10 of the drill pipe is shown on the drawing. The drill pipe is screwed to a rotating mechanism, which is not shown and disposed outside the borehole. By means of a feed motor, the rotating mechanism can be vertically reciprocated along a guide. When the cutter bit is forced against the bottom of the borehole by the feed motor and the weight of the drill pipe, the end face 7'' of the valve body 7 engages the cylinder 1 of the percussion drill, and the valve cone 3 is clear of the valve seat 8.

Under this condition, the compressed air which is supplied flows through the drill pipe, the fitting 9, the gap 5 between the valve cone 3 and the valve seat 8, the hollow spacer 2 and the bore 6 freely into the percussion drill so that the piston thereof imparts heavy blows to the cutter bit. On the other hand, when the drill rod is raised by the feed motor or when the cutter bit breaks into a cavity during the drilling operation, the percussion drill cylinder 1 will descend under the action of gravity relative to the valve body 7 and the compressed air which is supplied will force the valve cone 3 against the valve seat 8 because there is a difference between the pressure forces acting on the two ends of the valve cone. This position is indicated in dash-dot lines. The guide webs 4 are now clear of the spacer 2, and compressed air flows to the percussion drill only through the axial bore 6 in the valve cone 3 so that the flow of compressive air is strongly throttled. As a result, the piston of the percussion drill applies only light idle blows to the cutter bit so that a seizing on the wall of the borehole will be reliably prevented as the drill pipe is raised.

It is apparent that the valve according to the invention enables an operation of percussion drills with compressed air which is under a much higher pressure than the air previously used in such drills so that when other conditions are the same the use of this valve enables a much higher percussion and drilling performance than with the previously known arrangements.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. A valve for controlling the supply of pressure fluid from a first tubular member constituting a pressure fluid outlet to a second tubular member forming part of a pressure fluid consumer and movable relative to said first tubular member between a first position more remote from said first tubular member and a second position nearer to said first tubular member, which valve comprises an inner sleeve coaxially secured to said second tubular member, an outer sleeve surrounding said inner sleeve and coaxially secured to said first tubular member, said inner and outer sleeves defining together a flow path to establish a communication between said first and second tubular members, a valve seat secured to said outer sleeve and forming a frustoconical constriction in said flow path, a valve cone disposed in said flow path on the side of said valve seat which is opposite to said inner sleeve and axially movable relative to said valve seat and adapted to sealingly engage the same, said valve cone having an outside diameter which exceeds the inside diameter of said constriction and spacing means disposed between said valve cone and said inner sleeve and arranged to hold said valve cone clear of said valve seat unless said inner and outer sleeves are in a relative position corresponding to said second position of said second tubular member in which said valve cone sealingly engages said seat.

2. A valve as set forth in claim 1, in which said outer sleeve is secured to a first tubular member consisting of a fitting and said inner sleeve is secured to a second tubular member forming part of a reciprocating motor of a percussion drill and said inner and outer sleeves are arranged to assume said first position when said motor is operating under a load and to assume said second position when said motor is operating substantially under no load.

3. A valve as set forth in claim 1, which comprises a duct, which by-passes said constriction and which is open when said valve cone sealingly engages said valve seat.

4. A valve as set forth in claim 3, in which said duct is formed by a central axial bore in said valve cone.

5. A valve as set forth in claim 1, in which said spacing means comprise guide webs which are secured to said valve cone and extend in and are in slidable engagement with said outer sleeve.

6. A valve as set forth in claim 5, which comprises a collar mounted on the outside of said outer sleeve and a retaining cap having an internal shoulder surrounding said outer sleeve and adapted to be secured to said second tubular member in such a position that said collar is disposed between said internal shoulder and said second tubular member and the axial distance between said internal shoulder and said second tubular member exceeds the axial length of said collar, said collar having an outside diameter which exceeds the inside diameter of said shoulder and of said second tubular member and is adapted to engage said shoulder to define said first position and to engage said second tubular member to define said second position of said second tubular member.

* * * * *